No. 779,215. PATENTED JAN. 3, 1905.
C. H. GALE.
TRUCK.
APPLICATION FILED APR. 9, 1904.

2 SHEETS—SHEET 1.

Witnesses:
E. F. Wilson
F. Schlotfeld

Inventor:
Charles H. Gale
By Rudolph Fox
Attorney

No. 779,215. PATENTED JAN. 3, 1905.
C. H. GALE.
TRUCK.
APPLICATION FILED APR. 9, 1904.
2 SHEETS—SHEET 2.
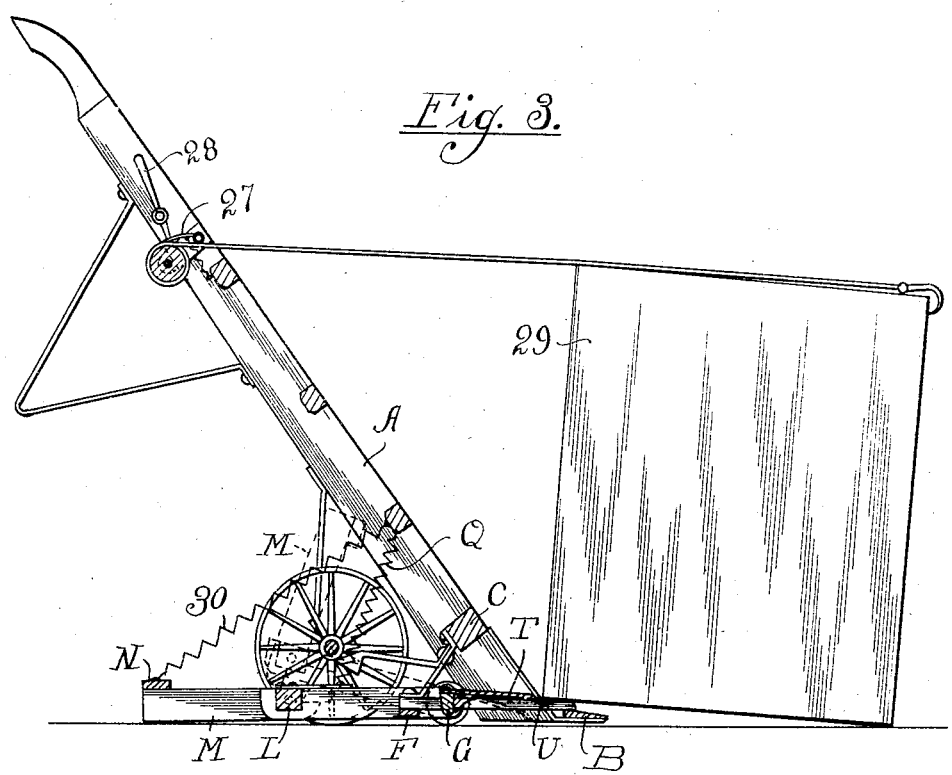
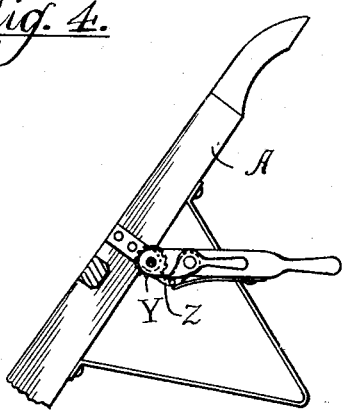
Witnesses:
E. F. Wilson
F. Schlotfeld
Inventor:
Charles H. Gale
By Rudolph —
Attorney.

No. 779,215. Patented January 3, 1905.

UNITED STATES PATENT OFFICE.

CHARLES H. GALE, OF CHICAGO, ILLINOIS.

TRUCK.

SPECIFICATION forming part of Letters Patent No. 779,215, dated January 3, 1905.

Application filed April 9, 1904. Serial No. 202,306.

*To all whom it may concern:*

Be it known that I, CHARLES H. GALE, a citizen of the United States, residing at Chicago, in the county of Cook and State of Illinois, have invented certain new and useful Improvements in Trucks; and I do hereby declare the following to be a full, clear, and exact description of the invention, such as will enable others skilled in the art to which it appertains to make and use the same.

My invention relates to a novel construction in a truck for handling heavy freight, which is particularly adapted for use in loading and unloading cars, &c., the object being to provide a truck by means of which heavy boxes and bales, &c., can be raised by the truckman and the truck easily inserted below the same; and it consists in the features of construction and combinations of parts hereinafter fully described and claimed.

Figure 1:
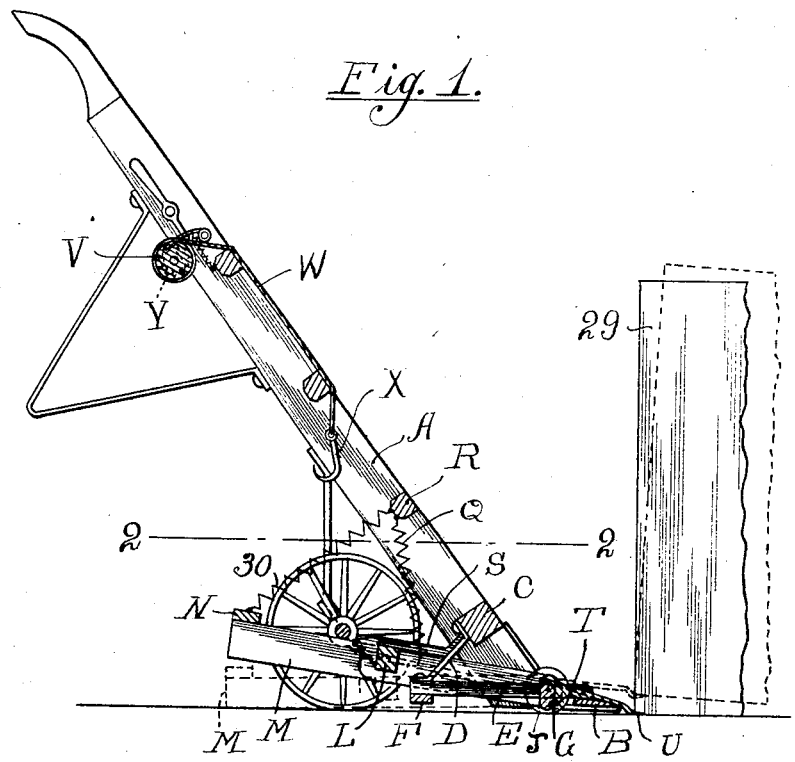
Figure 2:
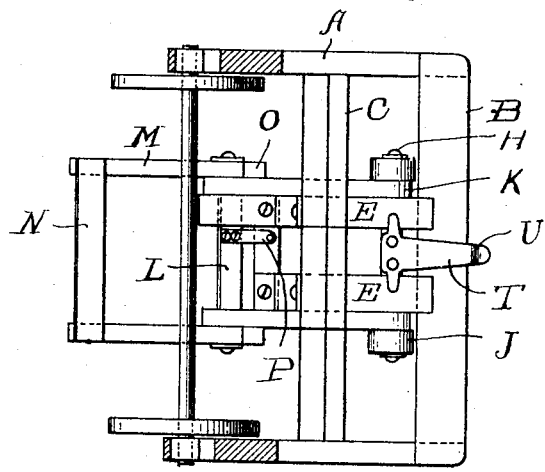

In the accompanying drawings, illustrating my invention, Figure 1 is a central longitudinal section of a truck constructed in accordance with my invention, showing the same in position to pick up a box or the like. Fig. 2 is a plan section of same on the line 2 2 of Fig. 1. Fig. 3 is a section similar to Fig. 1, showing the truck inserted underneath the box or bale. Fig. 4 is a detail sectional view showing the means for rotating the windlass on said truck.

In handling heavy pieces of freight it is almost impossible for a truckman to properly handle the truck to take up a heavy box or package, it being usually necessary for him to block his truck and then by means of his freight-hook partially raise the end of the box or package which he desires to remove and drag same upon the front end or nose-plate of the truck. This involves exceedingly hard labor and not infrequently it requires two or three men to place a package on the truck. It not infrequently happens that in attempting to so shift a heavy weight a truckman ruptures or strains himself, and when several men are required to place such package on a truck a great deal of loss of time and unnecessary hard labor is involved.

My present invention has for its object to provide an attachment for the truck by means of which heavy packages may be readily raised the requisite distance by the truckman, and while such package is held in its raised position the truck may be inserted underneath the raised edge or end of such package and the latter then readily tilted over, so as to rest upon said truck.

A further particular object of my said device is to enable such weight to be lifted by pressure of the foot of the truckman, thus leaving his hands free to operate the truck while holding such package in its raised position.

To this and other ends my invention comprises a truck A of ordinary construction, having the nose-plate B at its forward end, the latter being of ordinary construction and mounted in the usual manner. Secured at their forward ends to said nose-plate B and at their rear ends to cross-bar C of the truck by means of the bracket D are two arms E, connected together at their rear ends by means of cross-bar F. The said arms E form a guide for the projection G of the axle H of a pair of wheels J, the said axle being rigidly mounted adjacent its ends in the members K of a frame forming part of a foot-lever, by means of which the package is adapted to be tilted in order to insert the nose-plate B of the truck underneath the same. The said members K are connected together at their rear ends by means of a cross-bar L, and to the latter two arms M are pivotally secured, which are in turn connected together at their rear ends by means of cross-piece N, said arms M being partially cut away at their forward ends and adapted to engage stops O on said arms K to hold said arms M against pivotal movement in one direction. Mounted on said cross-bar L is a projection P, which is connected, by means of a spring Q, with the cross-bar R of the truck. Secured to said cross-bar C of said truck is a hook S, which extends rearwardly therefrom and is adapted to receive said cross-bar L when the latter reaches the forward limit of its movement, said spring Q serving to raise the said frame forming said foot-lever, and thus hold said cross-bar in engagement with said hook.

Mounted on said projection G of axle H is a frame T, which is tapered toward its free end, and the extreme free end of which is offset downwardly, as at U, and sharpened, so as to enable it to be inserted between the floor and the package to be transported or to be forced into the wood or other covering of the package, and thus enable the same to be raised. The said free end U of said frame T is adapted to project beyond the forward edge of said nose-guard B and also lower than the same.

At its forward end portion I provide said truck with a windlass comprising a shaft journaled in suitable bearings of said truck and carrying a winding-drum V, upon which the cable W to which the hook X is secured is attached. At each end of said shaft is a ratchet-wheel Y, one of which is adapted to be engaged by the dog on the hand-lever Z and the other of which is engaged by a spring-actuated dog 27, the latter being adapted to be turned and held out of engagement with said ratchet by means of the lever 28.

The operation of my device is as follows: Assuming that 29 represents a heavy box to be transported, the frame forming the foot-lever which is pivotally mounted and supported on said wheels J is moved to the forward limit of its movement relatively to said truck and the cross-bar L thereof held in engagement with said hook S by means of said spring Q. It will be noted that in this position the rear end of the frame is raised from the floor and the free end portion U of the arm T is depressed, so that it can be made to glide along the floor. While in this position the truckman moves his truck rapidly forward so as to cause said end U to force its way between the floor and the bottom of the box 29 or to embed itself therein adjacent the floor, the said arm T and foot-lever being held by said hook S against rearward movement relatively to said truck. By now placing his feet on his cross-bar N the truckman depresses the rear end of said foot-lever, thereby turning the same on its pivot, and thereby raising the said arm T, and thus tilting said box, as indicated in dotted lines in Fig. 1. The truck being free to move relatively to said foot-lever is now moved forward, so that the nose-plate thereof projects underneath said box, and the latter is then let down upon said nose-plate, said hook being readily withdrawn therefrom and passing between said arms E out of engagement with said box, as shown in Fig. 3. The said hook X is now inserted over the farthest upper edge of said box 29 and by means of said windlass the said truck is drawn up to a substantially vertical position beside said box, and the latter is then pulled over on said truck by drawing the upper end of the latter rearward.

As it may be desired to drop the rear end of the truck so that the latter is substantially horizontal, it is essential that said foot-lever be collapsible between its ends so as not to interfere with this position of said truck, and to this end said arms M are pivoted to said members K, as before described. In order to maintain said arms M and cross-piece N normally at the upper limit of their movement, I provide a spring 30, connecting said cross-piece N with said cross-piece R of the truck, said spring being adapted when said foot-lever reaches the rearward limit of its movement to draw up said arms M, thus maintaining same out of the way of the truckman's feet and permitting the truck to be handled as desired.

By means of my said device the average truckman is enabled to handle with ease boxes and packages which ordinarily are very difficult for two or three men to handle and prevents straining of muscles and cords, besides saving time and labor.

I desire to call particular attention to the fact that the most essential feature of my invention consists in providing what may be termed a "lifting-jack" which while carried by the truck is operable entirely independently of the latter, it being absolutely essential that the said lifting device and the truck be capable of free movement relatively to each other, it being obvious that if said truck should bear any part of the weight as the latter is raised such weight would bind said truck against movement and would thereby prevent the insertion of said nose-plate underneath the box or package. The grappling means, such as the windlass and hook, are also absolutely essential, as in the absence thereof great difficulty would be experienced in throwing the box over upon the truck after the nose-plate has been inserted. It will be obvious that when said truck is drawn over to a practically vertical position and the wheels thereof raised from the ground great leverage is provided for successfully tilting said weight backward with said truck, and thus receiving same upon said truck.

I claim as my invention—

1. The combination with a truck, of an independently-operable lever carried thereby and supported at its fulcrum on the floor when in position to be operated, said lever being longitudinally movable relatively to the truck, and one end being adapted to be projected beyond the nose-plate of the truck to engage and raise the package to be transported, said lever being adapted to support said package in its raised position while the truck is moved relatively to said lever to insert the nose-plate thereof under said package.

2. The combination with a truck, of a lever carried thereby, said lever being movable longitudinally and pivotally independently of said truck and fulcrumed between its ends, the fulcrum thereof being supported upon the floor when said lever is in position to be operated, one end of said lever being adapted to be projected beyond the nose-plate of the truck to engage and raise one end of the package and support the latter while the truck is moved relatively to said lever to insert said nose-plate underneath said package to receive the latter.

3. The combination with a truck, of a lever carried thereby, said lever being supported between its ends upon rollers movable on the floor when the truck is brought into position to receive a package, one end of said lever being adapted to be projected beyond the nose-plate of the truck to engage and raise one end of the package and support the latter while the truck is moved relatively to said lever to insert said nose-plate underneath said package to receive the latter.

4. The combination with a truck, of an independently-operable lever carried thereby and movable longitudinally and pivotally relatively thereto, one end of said lever being adapted to project beyond the nose-plate of the truck and engage the package to be raised, wheels resting on the floor and supporting said lever between its ends independently of the truck and forming the fulcrum thereof, and a stop on said truck disposed in the path of a part of said lever to hold same against movement in one direction relatively thereto.

5. The combination with a truck, of an independently-operable lever carried thereby and movable longitudinally and pivotally relatively thereto, said lever being fulcrumed between its ends and supported independently of said truck, said lever having a pointed end adapted to project beyond the nose-plate of the truck to engage the package to be transported to raise the same.

6. The combination with a truck, of independently-operable means carried thereby and movable longitudinally and pivotally relatively thereto for engaging and raising the package to be transported, said means including a lever fulcrumed between its ends, said fulcrum being adapted to be supported on the floor independently of said truck and the latter being movable relatively to said lever.

7. The combination with a truck, of an independently-operable lever carried thereby and movable pivotally and longitudinally relatively thereto and adapted to project at one end beyond the nose-plate of said truck, said lever being fulcrumed between its ends and the fulcrums thereof supported upon the floor independently of said truck, and a stop on said truck engaging said lever to hold same against longitudinal movement relatively to said truck in one direction, the latter being movable relatively to said lever when the latter supports the load.

8. The combination with a truck, of an independently-operable foot-lever carried thereby and movable relatively thereto, said lever being fulcrumed between its ends and the fulcrum thereof adapted to be supported upon the floor independently of said truck, one end of said lever comprising a sharp tongue adapted to project beyond the nose-plate of said truck when said lever is at one limit of its movement relatively to said truck, a stop on said truck adapted to engage said lever to hold same against rearward movement, and a spring engaging the rear end portion of said lever for raising same to engage said stop and depressing the sharp tongue at the other end thereof, substantially as described.

9. The combination with a truck, of an independently-operable relatively-movable foot-lever carried thereby, said foot-lever being pivotally mounted between its ends upon wheels adapted to rest upon the floor when said lever is operated, a sharp tongue on said lever at one end adapted to project beyond the nose-plate of the truck when said lever is at the forward limit of its movement, a stop on said truck adapted to engage said lever to hold same at the forward limit of its movement, a spring engaging the rear end portion of said lever to raise the same and hold same in engagement with said stop, and an extention member pivotally secured to the rear end of said lever.

10. The combination with a truck, of an independently-operable relatively-movable foot-lever carried thereby, said foot-lever being pivotally mounted between its ends upon wheels adapted to rest upon the floor when said lever is operated, a sharp tongue on said lever at one end adapted to project beyond the nose-plate of the truck when said lever is at the forward limit of its movement, a stop on said truck adapted to engage said lever to hold same at the forward limit of its movement, a spring engaging the rear end portion of said lever to raise the same and hold same in engagement with said stop, an extension member pivotally secured to said lever at its rear end, and a spring on said truck engaging said extension member at its free end to normally hold same turned up, substantially as described.

11. The combination with a truck, of an independently-operable lever carried thereby at one end, said lever being longitudinally and pivotally movable relatively to said truck and adapted to engage the package to be raised at one of its ends and supported between its ends independently of said truck when in operation, and grappling devices secured to the other end of said truck to engage the upper end portion of the package to be transported.

In testimony whereof I affix my signature in presence of two witnesses.

CHARLES H. GALE.

Witnesses:
 RUDOLPH WM. LOTZ,
 F. SCHLOTFELD.